(12) United States Patent
Felsted et al.

(10) Patent No.: US 7,310,650 B1
(45) Date of Patent: *Dec. 18, 2007

(54) SYSTEM, METHOD AND COMPUTER PROGRAM PRODUCT FOR MIGRATING DATA FROM ONE DATABASE TO ANOTHER DATABASE

(75) Inventors: Patrick R. Felsted, Cedar Hills, UT (US); Timothy S. Larsen, Orem, UT (US)

(73) Assignee: Novell, Inc., Provo, UT (US)

( * ) Notice: Subject to any disclaimer, the term of this patent is extended or adjusted under 35 U.S.C. 154(b) by 381 days.

This patent is subject to a terminal disclaimer.

(21) Appl. No.: 11/053,327

(22) Filed: Feb. 9, 2005

Related U.S. Application Data

(63) Continuation of application No. 10/013,514, filed on Dec. 13, 2001, now Pat. No. 6,915,287.

(51) Int. Cl.
*G06F 17/00* (2006.01)
*G06F 7/00* (2006.01)
(52) U.S. Cl. ............. 707/103 R; 707/10; 707/104.1
(58) Field of Classification Search ............... 707/1–5, 707/9, 10, 100–102, 103 R, 104.1, 200, 203; 709/206, 220, 223–226, 245; 717/137, 141
See application file for complete search history.

(56) References Cited

U.S. PATENT DOCUMENTS

| | | | |
|---|---|---|---|
| 5,566,332 A | 10/1996 | Adair et al. ............... 395/600 |
| 5,627,979 A | 5/1997 | Chang et al. ............... 345/763 |
| 5,642,505 A | 6/1997 | Fushimi ...................... 395/620 |
| 5,708,828 A | 1/1998 | Coleman ..................... 395/785 |
| 5,717,924 A | 2/1998 | Kawai .......................... 395/613 |
| 5,778,373 A | 7/1998 | Levy et al. .................. 707/100 |
| 5,778,390 A | 7/1998 | Nelson et al. ............... 707/204 |
| 5,787,433 A | 7/1998 | Plotkin et al. .............. 707/101 |
| 5,832,274 A | 11/1998 | Cutler et al. ................ 395/712 |
| 5,930,806 A | 7/1999 | Taira et al. .................. 707/204 |
| 5,970,490 A | 10/1999 | Morgenstern ................. 707/10 |
| 6,016,499 A * | 1/2000 | Ferguson .................. 707/104.1 |
| 6,085,188 A | 7/2000 | Bachmann et al. ............ 707/3 |
| 6,105,069 A * | 8/2000 | Franklin et al. ............. 709/229 |
| 6,119,130 A | 9/2000 | Nguyen et al. ............. 707/203 |
| 6,151,608 A | 11/2000 | Abrams ....................... 707/204 |
| 6,163,776 A | 12/2000 | Periwal .......................... 707/4 |
| 6,173,289 B1 * | 1/2001 | Sonderegger et al. ... 707/103 R |
| 6,173,290 B1 * | 1/2001 | Goldberg ................. 707/103 R |
| 6,230,164 B1 | 5/2001 | Rekieta et al. .............. 707/201 |

(Continued)

OTHER PUBLICATIONS

Pind, Lars, "*LDAP Introduction*", May 8, 2000, printed from web site Sep. 25, 2001, 5 pages.

(Continued)

*Primary Examiner*—Jeffrey Gaffin
*Assistant Examiner*—Jacques Veillard
(74) *Attorney, Agent, or Firm*—Pillsbury Winthrop Shaw Pittman, LLP

(57) ABSTRACT

A software tool that is useful when one is attempting to migrate data from one database to another database. In one aspect of the invention, the software tool reduces the complications that may arise when one attempts to migrate data from one Lightweight Directory Access Protocol (LDAP) directory to another LDAP directory, where the schemas for the two directories are not the same.

30 Claims, 7 Drawing Sheets

U.S. PATENT DOCUMENTS

| | | |
|---|---|---|
| 6,233,582 B1 | 5/2001 | Traversat et al. ............ 707/102 |
| 6,366,954 B1 * | 4/2002 | Traversat et al. ............ 709/220 |
| 6,418,446 B1 * | 7/2002 | Lection et al. ........... 707/103 R |
| 6,424,358 B1 * | 7/2002 | DiDomizio et al. ......... 715/762 |
| 6,587,856 B1 * | 7/2003 | Srinivasan et al. .......... 707/102 |
| 6,615,223 B1 * | 9/2003 | Shih et al. ................... 707/201 |
| 6,915,287 B1 * | 7/2005 | Felsted et al. ................. 707/1 |
| 6,970,893 B2 * | 11/2005 | Dahlstedt .................... 707/206 |
| 2002/0138570 A1 * | 9/2002 | Hickey ....................... 709/204 |

OTHER PUBLICATIONS

Donnelly, Michael, "*An Introduction to LDAP*", Apr. 28, 2000, printed from web site Sep. 25, 2001, 9 pages.

* cited by examiner

SYSTEM, METHOD AND COMPUTER PROGRAM PRODUCT FOR MIGRATING DATA FROM ONE DATABASE TO ANOTHER DATABASE

CROSS-REFERENCE TO RELATED APPLICATIONS

This application is a continuation application of U.S. patent application Ser. No. 10/013,514, filed Dec. 13, 2001 now U.S. Pat. No. 6,915,287, the entire contents of which are hereby incorporated by reference.

BACKGROUND OF THE INVENTION

1. Field of the Invention

The present invention relates to the migration of data from a source database to a destination database, where the schema of the destination database is different from the schema of the source database.

2. Discussion of the Background

Many databases, including directories and other databases, have a particular schema that defines what can be stored in the database. In a relational database, the schema defines tables, the fields in each table, and the relationships between fields and tables. In a directory, the schema defines object classes and attributes.

It often occurs that one desires to migrate (e.g., copy) data from one database to another database. For example, if corporation A acquires corporation B, corporation A may want to migrate data stored in one of corporation B's database to one of corporation A's database.

Migrating data from one database to another database is not problematic if both databases have the same schema. However, if the databases do not have the same schema, then problems may arise due to potential incompatibilities between the two schemas.

SUMMARY OF THE INVENTION

The present invention provides a software tool that is useful when one is attempting to migrate data from one database to another database. In one aspect of the invention, the software tool reduces the complications that may arise when one attempts to migrate data from a source database, for example a first Lightweight Directory Access Protocol (LDAP) directory, to a destination database, for example a second LDAP directory, particularly where the schemas for the two directories are not the same.

In one embodiment, the tool performs a process that comprises: (1) comparing the schema of a source directory to the schema of the destination directory; and (2) updating indirectly the schema of the destination directory to be compatible with the source directory's schema by, for example, producing a command file that can be used at a later time to update the schema of the destination directory. For example, if an object class defined in the source schema includes an attribute in its "MAY" list that is not in the "MAY" list of a corresponding object class defined in the destination schema, then the destination schema will be indirectly modified to include the attribute in the "MAY" list of the corresponding object class.

Advantageously, the source and destination directories may be LDAP directories and the command file may be an lightweight directory interchange format (LDIF) file. However, the invention is applicable to other types of directories and formats.

The tool may further be operable to perform a process that comprises: (1) comparing the schema of the source directory to the schema of the destination directory; and (2) updating directly the schema of the destination directory in order to make its schema compatible with the source's schema by, for example, sending requests to an LDAP server that is associated with the destination directory.

Additionally, the tool is further operable to perform a process that comprises: (1) checking each entry from the source directory that is to be added to the destination directory to see whether the destination directory's schema will allow the entry to be added to the directory; (2) if the destination directory's schema will not allow the entry to be added to the directory, the destination directory's schema is updated so that the entry can be added to the destination directory; and (3) adding the entry to the destination directory.

In one aspect, the tool compares the source schema with the destination schema by: creating a first list of object class records, where each object class record in the first list is associated with an object class defined in the source schema and includes information about the associated object class; creating a second list of object class records, where each object class record in the second list is associated with an object class defined in the destination schema and includes information about the associated object class; storing both lists in a memory or a cache; selecting a record from the first list; and comparing the selected record to the records in the second list to find a matching or partially matching record. If the second list does not include a matching or partially matching record, then the destination schema is modified by adding to the destination schema an object class that is identical to the object class associated with the object class record selected from the first list. If the second list does include a matching record, then a determination is made as to whether the destination schema needs to be modified in order to be compatible with the source schema, wherein the determination is based at least in part on information from the selected object class record and the matching object class record. And if the second list includes a partially matching record, then the destination schema is modified by adding to the destination schema an object class that is nearly identical to the object class associated with the object class record selected from the first list; the only difference being that the added object class will have a different OID.

Additionally, the tool creates a first list of attribute records, where each attribute record in the first list is associated with an attribute defined in the source schema and includes information about the associated attribute; creates a second list of attribute records, where each attribute record in the second list is associated with an attribute defined in the destination schema and includes information about the associated attribute; stores both attribute lists in a memory or a cache; selects a record from the first list; and compares the selected record to the records in the second list to find a matching or partially matching record. If the second list does not include a matching or partially matching record, then the destination schema is modified by adding to the destination schema an attribute that is identical to the attribute associated with the attribute record selected from the first list. If the second list does include a matching or partially matching record, then content from the attribute record selected from the first list is compared to content from the matching attribute record to determine whether and how the destination schema needs to be modified in order to be compatible with the source schema. And if the second list includes a partially matching record, then the destination schema is modified by adding to the destination schema an attribute that is nearly identical to the attribute associated with the attribute record selected from the first list; the only difference being that the added attribute will have a different OID.

The above and other objects, features, and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

While the present invention may be embodied in many different forms, there is described herein in detail an illustrative embodiment with the understanding that the present disclosure is to be considered as an example of the principles of the invention and is not intended to limit the invention to the illustrated embodiment.

Figure 1:
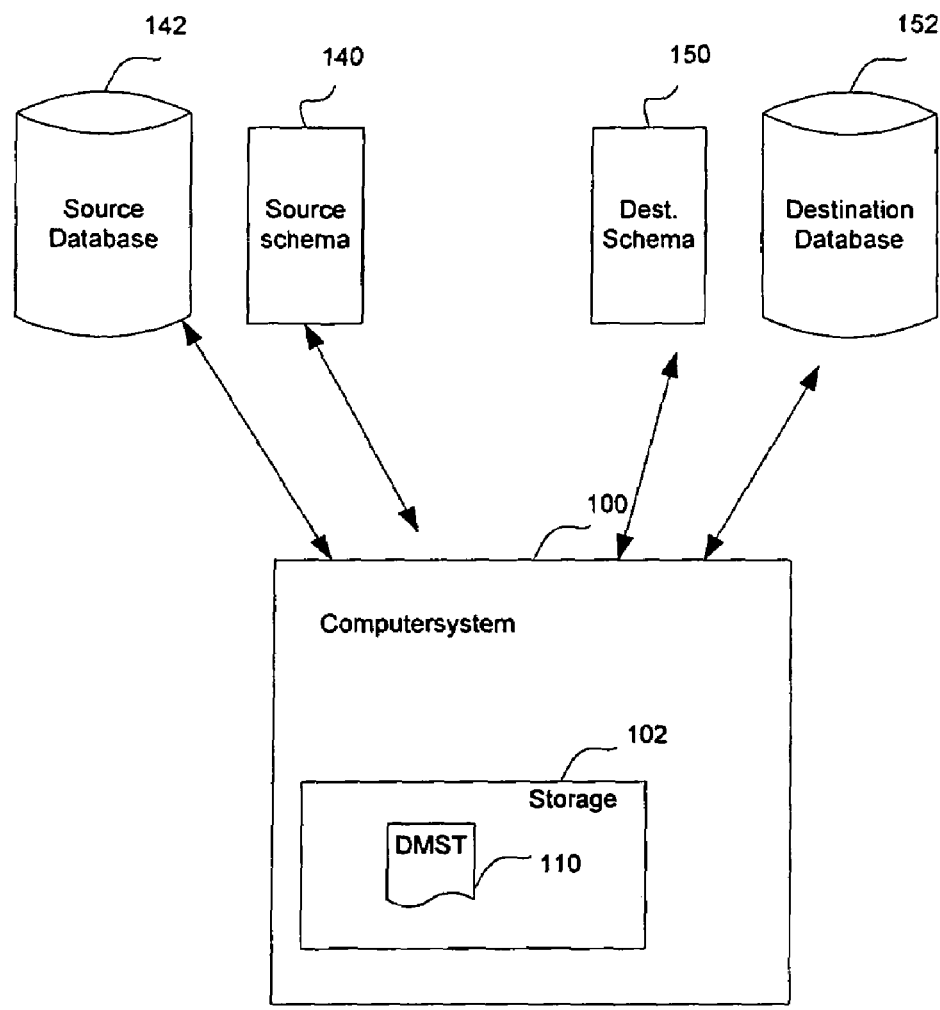
FIG. 1 is a block diagram showing an illustrative embodiment of the present invention.
Figure 2A:
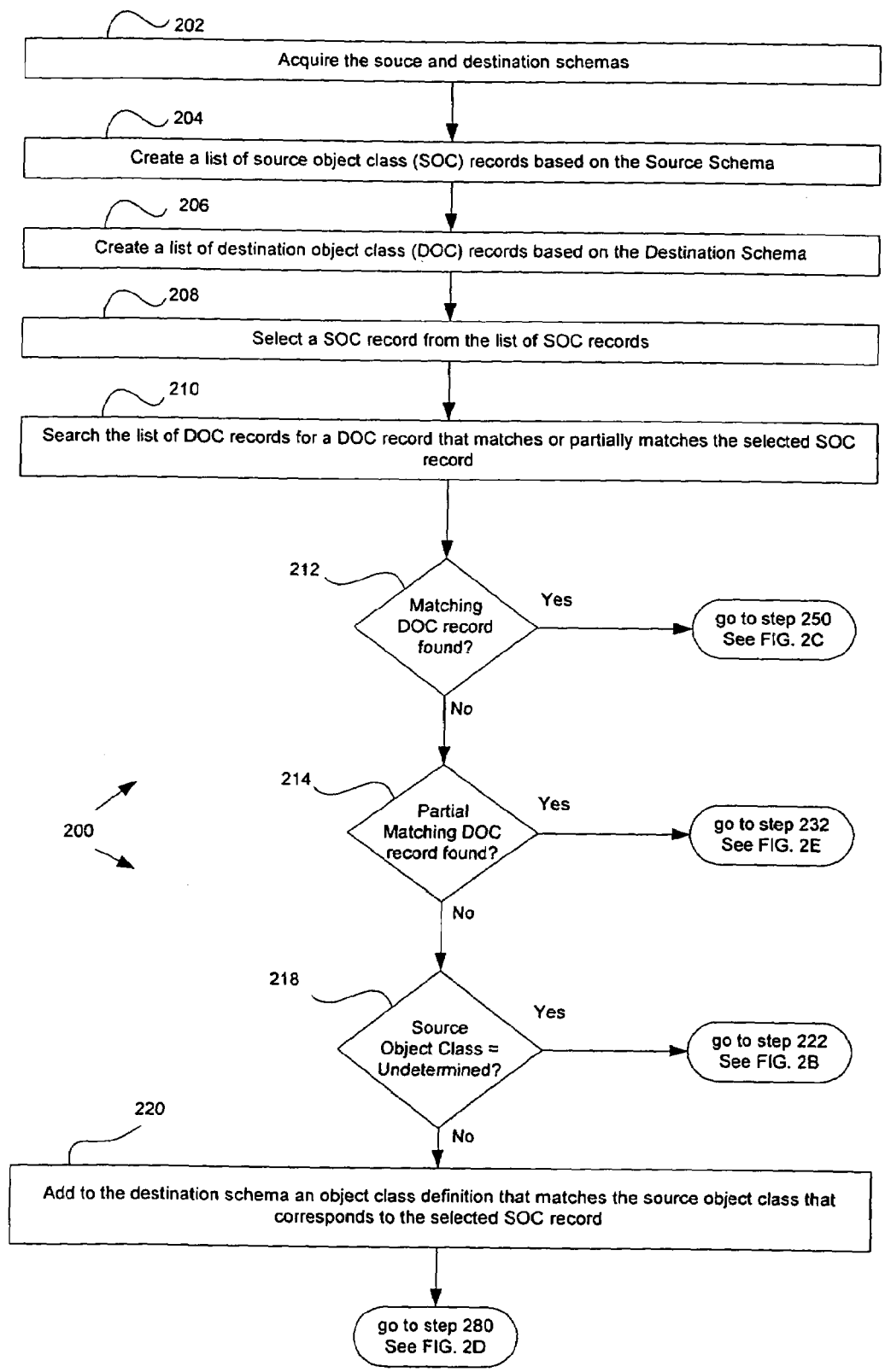
FIGS. 2A-E show a flow chart illustrating a process according to the present invention for resolving schema conflicts.
Figure 2B:
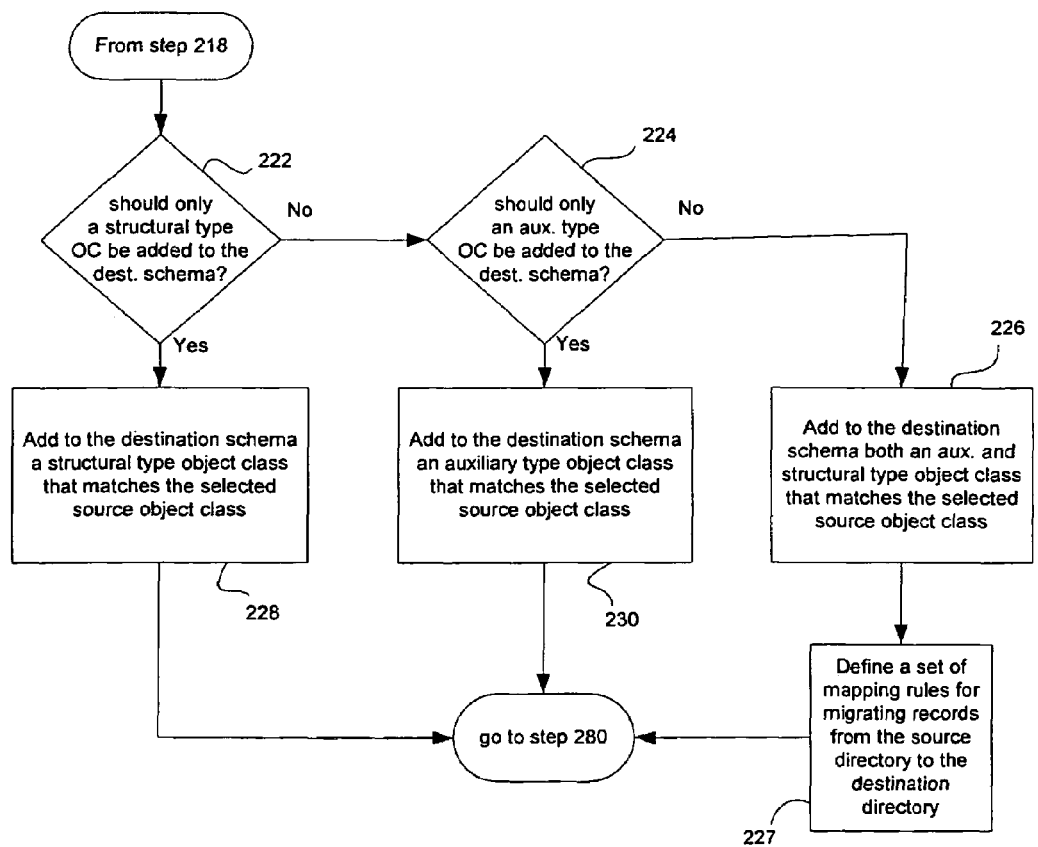
Figure 2C:
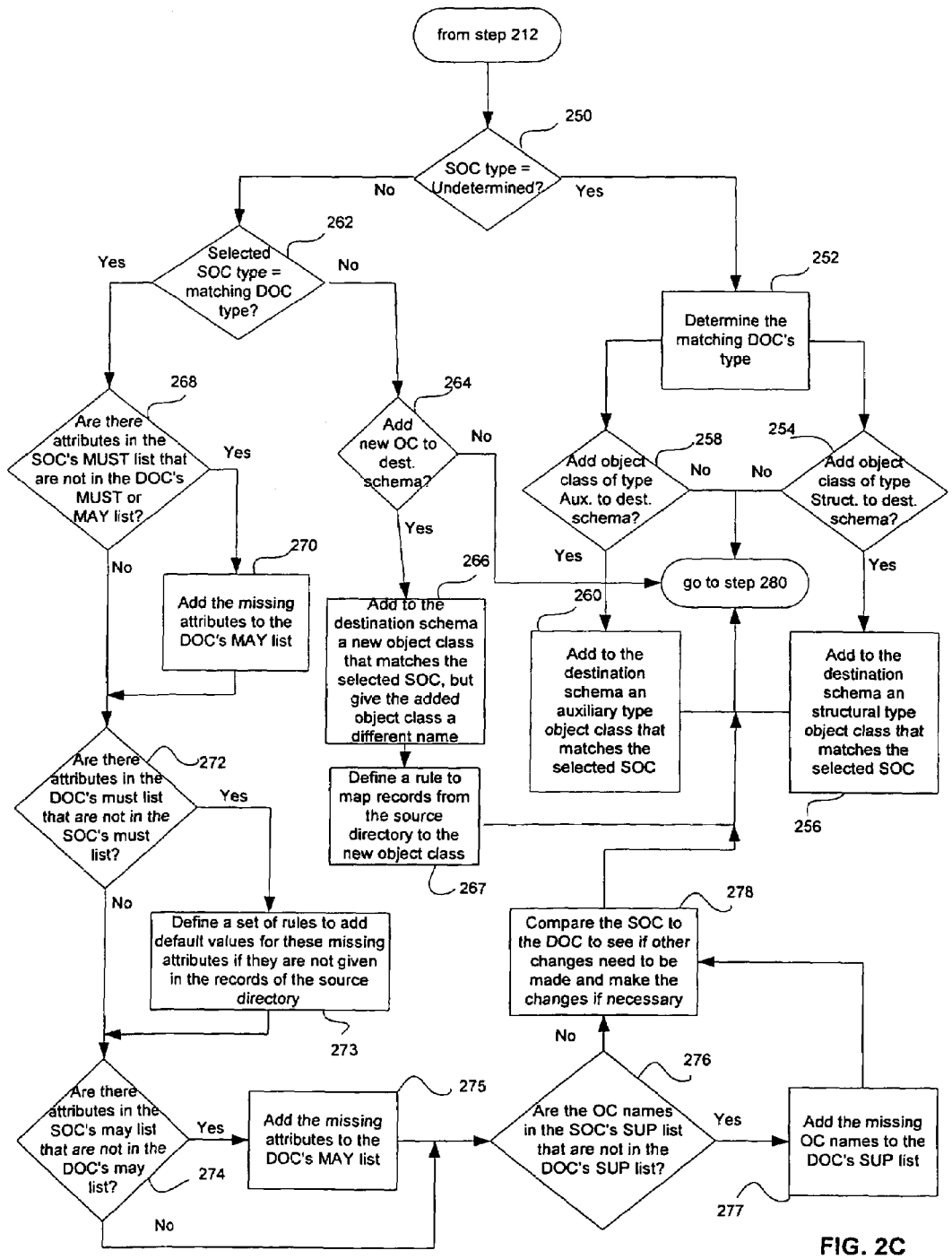
Figure 2D:
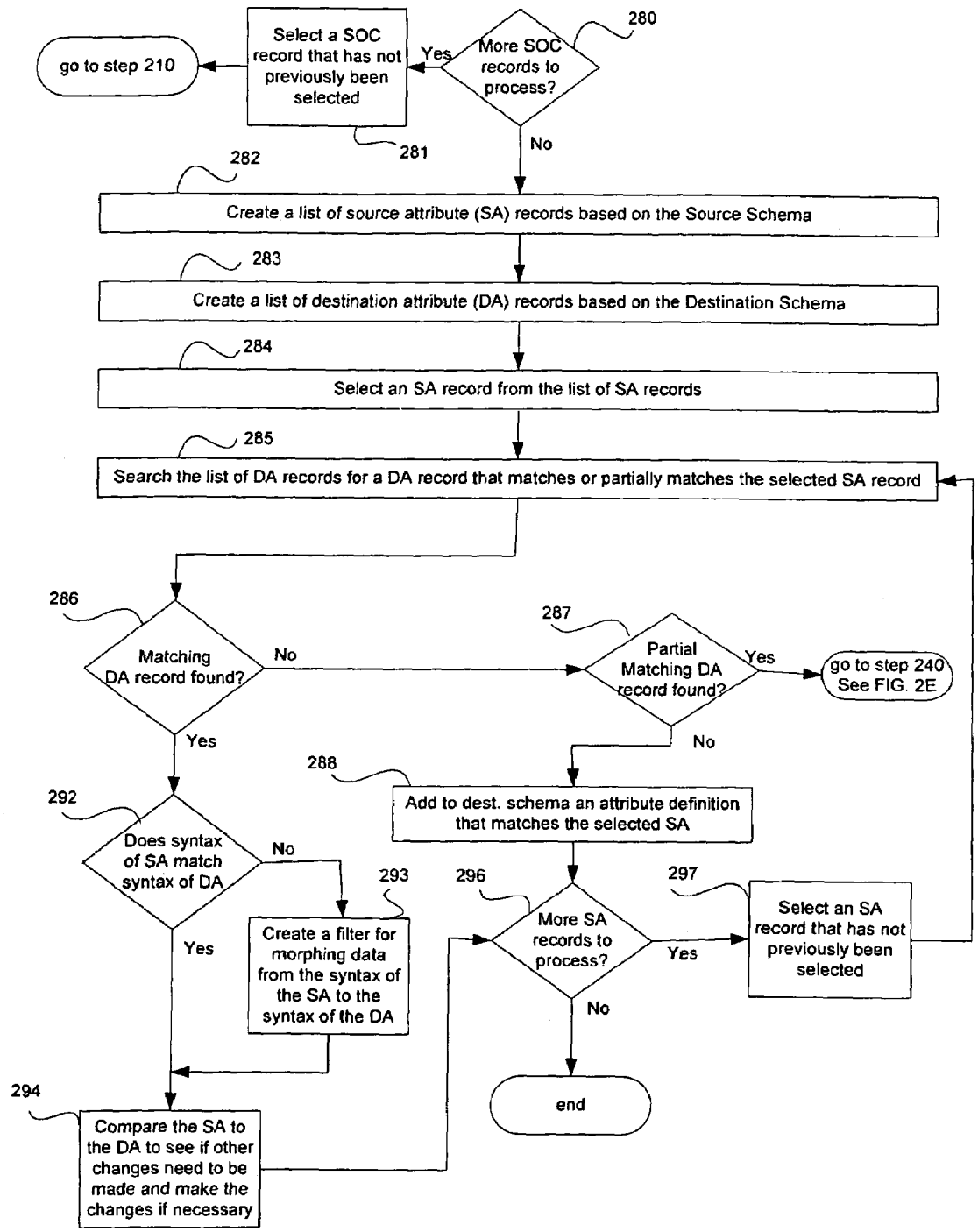
Figure 2E:
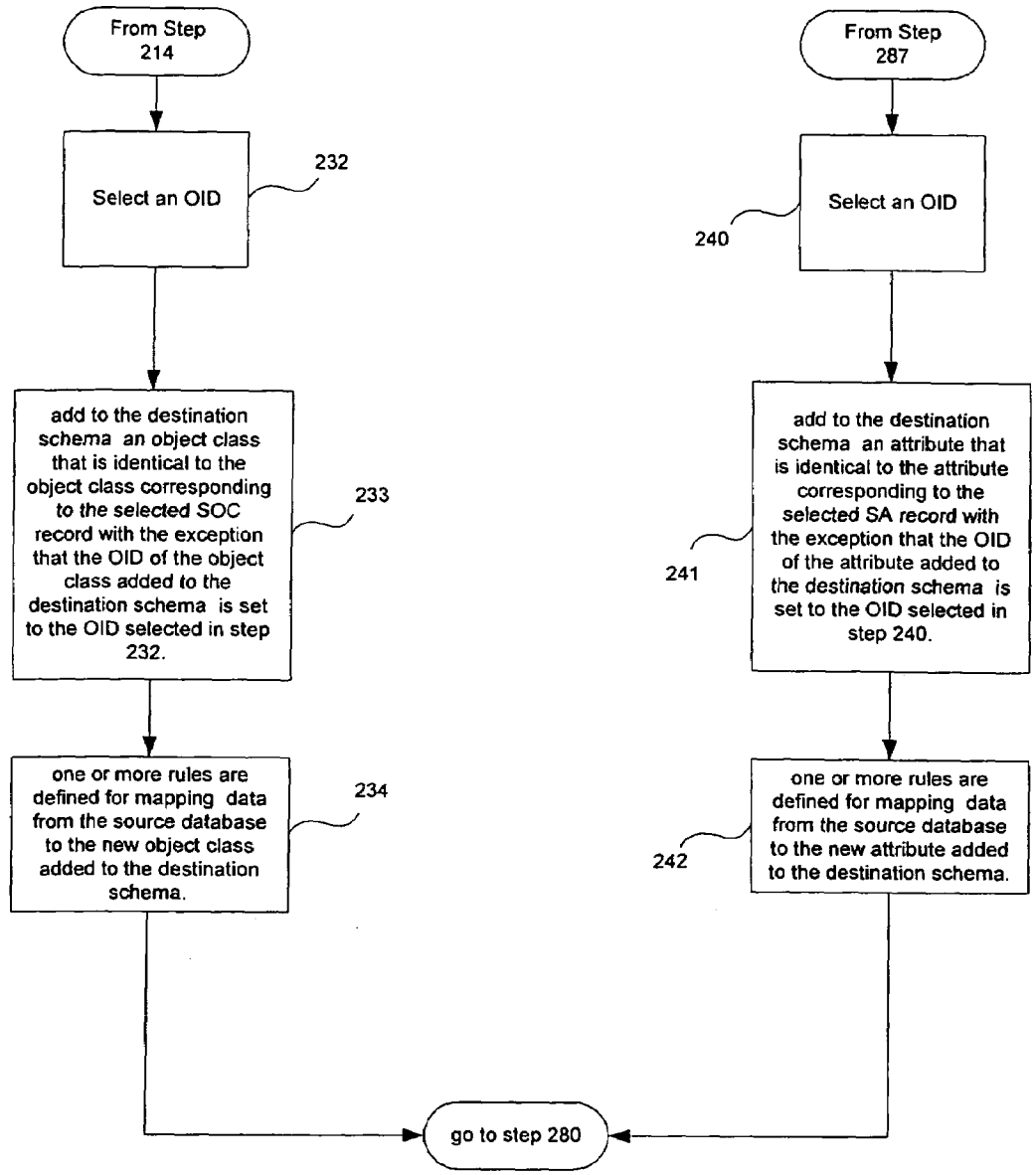

FIG. 1 is a block diagram showing an illustrative embodiment of the present invention. In the embodiment shown in FIG. 1, the present invention includes a computer system 100 having a computer readable medium 102 that stores a data migration software tool (DMST) 110 that comprises one or more computer programs. Computer system 100 is operable to execute DMST 110. When executed, DMST 110 can control computer system 100 to resolve schema conflicts between a source schema 140 and a destination schema 150. Resolving schema conflicts between source schema 140 and destination schema 150 is useful when one desires to migrate records from a source database 142 associated with source schema 140 to a destination database 152 associated with destination schema 150.

DMST 110 has preferably at least three modes of operation. That is, in one embodiment, DMST 110 can resolve schema conflicts in any one of three different ways. First, DMST 110 can resolve schema conflicts by performing what is termed a "schema compare" operation. In this procedure, DMST 110 compares source schema 140 with destination schema 150 and then indirectly updates the destination schema to be compatible with source schema 140 by producing a command file that can be used to update destination schema 150. The command file includes commands for adding elements (such as attributes and object classes) to destination schema 150 and/or modifying elements of destination schema 150. In one embodiment, the command file is an "LDIF file." That is, it is a file that conforms to the lightweight directory interchange format (LDIF).

Second, DMST 110 can resolve schema conflicts by performing what is termed an "add missing schema" operation. In this procedure, DMST 110 compares source schema 140 with destination schema 150 and then updates destination schema 150 directly with all of the changes that need to be made in order to make destination schema 150 compatible with source schema 140. In one embodiment where destination database 152 is an LDAP directory, DMST 110 may update destination schema 150 directly by sending requests to the LDAP server (not shown) that is associated with directory 152.

Additionally, DMST 110 can resolve schema conflicts by performing what is termed an "update as needed" operation. In this procedure, DMST 110 retrieves a record from source database 142, determines whether destination schema 150 will allow the record to be added to destination database 152, and, if destination schema does not allow the record to added to database 152, then updates destination schema just enough so that the record can be added to destination database 152 without causing an error. The "updated as needed procedure" can be performed for each record in source database 142 that one desires to add to destination database 152.

FIGS. 2A-E illustrates a process 200 for resolving schema conflicts, according to one embodiment. Although process 200 is described below as a series of consecutive steps, the invention is not limited to any particular order of the steps, and the invention does not necessarily require all of the steps so that one or more of the steps may be omitted without departing from the intended scope of the invention.

Process 200 is implemented by DMST 110 and may be used in performing the "schema compare" and "add missing schema" operations. In this embodiment, databases 142 and 152 are LDAP directories.

Process 200 begins in step 202, where DMST 110 acquires source schema 140 and destination schema 150. Either schema may be acquired from an LDIF file, from the LDAP servers associated with source directory 142 and destination directory 152, or otherwise.

In step 204, DMST 110 parses the acquired source schema information 140 to create a list of source object class (SOC) records. Each SOC record in the list corresponds to an object class (OC) that is defined in source schema 140. An object class that is defined in a source schema is referred to herein as a source object class or SOC. The list of SOC records is preferably stored in a memory or cache within computer system 100.

Figure 3A:
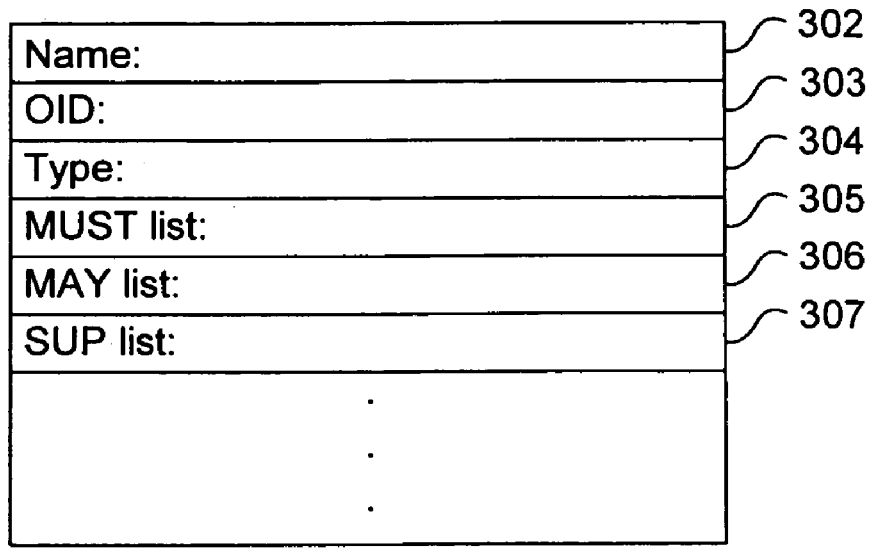
FIG. 3A is representation of an object class record.

FIG. 3A illustrates an example SOC record 300 that corresponds to an object class defined in source schema 140. At a minimum, record 300 includes field 302 or 303, but may also include other fields, such as fields 304-307. Field 302 stores the name of the corresponding object class, field 303 stores the object identifier (OID) of the corresponding object class, field 304 stores the type of the corresponding object class (the type can be one of: Auxiliary, Structural, Undefined, or Abstract), field 305 stores the list of attribute names that appear in the corresponding object class' MUST list, field 306 stores the list of attribute names that appear in the corresponding object class' MAY list, and field 307 stores the items that appear in the corresponding object class' SUP list.

In step 206, DMST 110 parses the acquired destination schema information 150 to create a list of destination object class (DOC) records. Each DOC record in the list corresponds to an object class that is defined in destination schema 150. An object class that is defined in a destination schema is referred to as a destination object class or DOC. The list of DOC records is preferably stored in a memory or cache within computer system 100. A DOC record includes the same fields as a SOC record.

In step 208, DMST 110 selects a record from the list of SOC records. In step 210, DMST 110 searches each record in the list of DOC records for a DOC record that "matches" or "partially matches" the selected SOC record. A DOC record "matches" a SOC record when the object class Name in the DOC record matches the object class Name in the SOC record. A DOC record "partially matches" a SOC record when the object class OID in the DOC record matches the object class OID in the SOC record, but the object class Name in the DOC record does not match the object class Name in the SOC record.

In step 212, a determination is made as to whether a matching DOC record was found. If a matching DOC record was found, control passes to step 250, otherwise control passes to step 214.

In step 214, a determination is made as to whether a partially matching DOC record was found. If a partially matching DOC record was found, control passes to step 232, otherwise control passes to step 218.

In step 218, DMST 110 determines whether the type field 304 of the selected SOC record indicates that the corresponding object class is of an Undefined type. If the corresponding object class is determined to be of Undefined type, then control passes to step 222, otherwise control passes to step 220.

In step 220, DMST 110 directly or indirectly adds to the destination schema 150 an object class definition that matches exactly the object class that corresponds to the selected SOC record. DMST 110 may directly add the object class definition to destination schema 150 by, for example, communicating with an LDAP server associated with destination schema 150 and sending one or more requests to the LDAP server that causes the LDAP server to add the object class to destination schema 150. DMST 110 may indirectly add the object class definition to destination schema 150 by, for example, adding an entry to an LDIF file, which then can be used at a later time to add the object class to destination schema 150. After step 220, control passes to step 280.

In step 222, DMST 110 determines whether only a Structural type object class that matches the object class that corresponds to the selected SOC record need be added to destination schema 150. If only a Structural type object class need be added to destination schema 150, control passes to step 228, otherwise control passes to step 224. Only a Structural type object class need be added to destination schema 150 if (1) there is at least one record in directory 142 for which all object class values in the record, except the object class associated with the selected SOC, refer to an abstract or auxiliary object class and (2) there is not one record in directory 142 with the selected SOC as one of its object classes that has a structural object class value that is not in the "SUP" line of the object class that corresponds to the selected SOC record.

In step 224, DMST 110 determines whether only an Auxiliary object class that matches the object class that corresponds to the selected SOC record need be added to destination schema 150. If only an Auxiliary type object class need be added to destination schema 150, control passes to step 230, otherwise control passes to step 226. Only an Auxiliary type object class need be added to destination schema 150 if (A) (1) there is at least one record in source directory 142 that has a structural object class value that is not in the "SUP" line of the object class that corresponds to the selected SOC record and (A) (2) there is not one record in source directory 142 in which all object class values refer to an abstract or auxiliary object class, or (B) (1) there is not one record in directory 142 in which all object class values refer to an abstract or auxiliary object class and (B) (2) there is not one record in directory 142 that has a structural object class value that is not in the "SUP" line of the object class that corresponds to the selected SOC record.

When process 200 reaches step 226, it means that the object class corresponding to the selected SOC record cannot be mapped directly to the destination schema, for example, because there is a compatibility issue. DMST 110 gets around this compatibility issue by selecting two OIDs from a set of registered OIDs, adding to destination schema 150 two new object classes, and setting the OID of the two new object classes to the selected OIDs, respectively. Both of these object classes match the object class that corresponds to the selected SOC record, but one of the two object classes is defined as having a Structural type and the other object class is defined as having an Auxiliary type. Also, the names of both of the added object classes are slightly different to avoid a name conflict. Additionally, a set of rules is defined to map each record in source database 142 that is a member of the object class in question to the Auxiliary or Structural object class, depending on the data contained in the record (step 227). After step 227, control passes to step 280.

In step 228, DMST 110 selects an OID from a set of registered OIDs, adds, directly or indirectly, to the destination schema 150 an object class definition that matches exactly the object class that corresponds to the selected SOC record, with the exception that the added object class is of type Structural, and sets the OID of the object class definition to the selected OID. After step 288, control passes to step 280.

In step 230, DMST 110 selects an OID from a set of registered OIDs, adds, directly or indirectly, to the destination schema 150 an object class definition that matches exactly the object class that corresponds to the selected SOC record, with the exception that the added object class is of type Auxiliary, and sets the OID of the object class definition to the selected OID. After step 230, control passes to step 280.

In step 232, DMST 110 selects an OID from a set of registered OIDs. Next (step 233), DMST 110, directly or indirectly adds to destination schema 150 an object class that is identical to the object class corresponding to the selected SOC record with the exception that the OID of the object class added to destination schema 150 is set to the OID selected in step 232. Next (step 234), a one or more rules are defined to map each record in source database 142 that is a member of the object class in question to the object class added in step 233. After step 234, control passes to step 280.

In step 250, DMST 110 determines whether the object class type in the selected SOC record is Undefined and whether the object class type in the matching DOC record is not Undefined. If the object class type in the selected SOC record is Undefined and the object class type in the matching DOC record is not Undefined, then control passes to step 252, otherwise control passes to step 262.

In step 252, DMST 110 determines the object class type in the matching DOC record. If the type is Auxiliary, control passes to step 254, and if the type is Structural control passes to step 258.

In step 254, tool 110 determines whether to add a new object class of type Structural to destination schema 150. This determination is based on whether (1) there is at least one record in source directory 142 for which all object class values in the record refer to an abstract or auxiliary object class and (2) the contents of a configuration file. If there is at least one record in source directory 142 for which all object class values in the record refer to an abstract or auxiliary object class and a "allow-rename" flag is set to TRUE in the configuration file, then control passes to step 256, otherwise control passes to step 280.

In step 256, DMST 110 directly or indirectly adds to destination schema 150 an object class of type Structural. The added object class matches the object class that corresponds to the selected SOC record in all respects except that the type, name and ODD are different. The OID of the added object class is selected by DMST 110 from a set of registered OIDs, and the name of the added object class may be generated by DMST 110 and is preferably based on the name of the object class corresponding to the selected SOC record. For example, if the name of the object class from source schema 140 is "obj-class1," then the name of the object class added to destination schema 150 is "obj-class1-struct." After step 256, control passes to step 280.

In step 258, tool 110 determines whether to add a new object class of type Auxiliary to destination schema 150. This determination is based on the contents of a configuration file. If an "allow-rename" flag is set to TRUE in the configuration file, then control passes to step 260, otherwise control passes to step 280.

In step 260, DMST 110 directly or indirectly adds to destination schema 150 an object class of type Auxiliary. The added object class matches the object class that corresponds to the selected SOC record in all respects except that the type, name, and OID are different. The OID of the added object class is selected by DMST 110 from a set of registered OIDs, and the name of the added object class may be generated by DMST 110 and is preferably based on the name of the object class corresponding to the selected SOC record. After step 260, control passes to step 280.

In step 262, DMST 110 determines whether the object class corresponding to the selected SOC record and the object class corresponding to the matching DOC record are of the same type. If they are not of the same type, control passes to step 264, otherwise control passes to step 268.

In step 264, DMST 110 determines whether to add a new object class to destination schema 150. If it is determined that a new object class should be added to destination schema 150, then control passes to step 266, otherwise control passes to step 280. The determination as to whether to add the new object class to destination schema 150 is based on the contents of the configuration file. That is, if the "allow-rename" flag is set to TRUE, then the new object class will be added to destination schema 150.

In step 266, DMST 110 directly or indirectly adds to destination schema 150 the new object class. The added object class matches the object class that corresponds to the selected SOC record in all respects except that the names and OIDs are different. The OID of the added object class is selected by DMST 110 from a set of registered OIDs, and the name of the added object class may be generated by DMST 110 and is preferably based on the name of the object class corresponding to the selected SOC record. Additionally, a rule is defined to map records from source directory 142 to the new object class (step 267). After step 267, control passes to step 280.

In step 268, DMST 110 determines whether there are attributes listed in the MUST field 305 of the selected SOC record that are not listed in the MUST field 305 nor MAY field 306 of the matching DOC record. If there are attributes listed in the MUST field 305 of the selected SOC record that are not listed in the MUST field 305 nor MAY field 306 of the matching DOC record, control passes to step 270, otherwise control passes to step 272. In step 270, DMST 110 modifies the object class corresponding to the matching DOC record by adding to the object class' "May" list the attributes that are listed in the MUST field 305 of the selected SOC record that are not listed in the MUST field 305 nor MAY field 306 of the matching DOC record. DMST 110 may modify the object class by adding an entry to the LDIF file or sending command to the LDAP server. After step 270, control passes to step 272.

In step 272, DMST 110 determines whether there are attributes listed in the MUST field 305 of the matching DOC record that are not listed in the MUST field 305 of the selected SOC record. If there are attributes listed in the MUST field 305 of the matching DOC record that are not listed in the MUST field 305 of the selected SOC record, control passes to step 273, otherwise control passes to step 274. In step 273, a set of rules are defined to add default values for these attributes if they are not given in the records of source directory 142. After step 273, control passes to step 274.

In step 274, DMST 110 determines whether there are attributes listed in the MAY field 306 of the selected SOC record that are not listed in the MAY field 306 of the matching DOC record. If there are attributes listed in the MAY field 306 of the selected SOC record that are not listed in the MAY field 306 of the matching DOC record, control passes to step 275, otherwise control passes to step 276. In step 275, DMST 110 modifies the object class corresponding to the matching DOC record by adding to the object class' "May" list the attributes that are listed in the MAY field 306 of the selected SOC record that are not listed in the MAY field 306 of the matching DOC record. After step 275, control passes to step 276.

In step 276, DMST 110 determines whether there are object class names listed in the SUP field 307 of the selected SOC record that are not listed in the SUP field 307 of the matching DOC record. If there are object class names listed in the SUP field 307 of the selected SOC record that are not listed in the SUP field 307 of the matching DOC record, control passes to step 277, otherwise control passes to step 278. In step 277, DMST 110 modifies the object class corresponding to the matching DOC record by adding to the object class' "SUP" list the object class names that are listed in the SUP field 306 of the selected SOC record that are not listed in the SUP field 306 of the matching DOC record. After step 277, control passes to step 278.

In step 278, other components of the selected SOC record may be compared to the corresponding components of the DOC record to determine if other changes to the object class corresponding to the selected DOC record need to made and those changes are made using the values from the SOC record to replace the values in the object class so that the object class corresponding to the selected DOC record will more closely match the object class corresponding to the selected SOC record. After step 278, control passes to step 280.

In step 280, DMST 110 determines whether there are any SOC records in the list that have not been selected. If there are, control passes to step 281, otherwise control passes to step 282. In step 281, DMST 110 selects from the list of SOC records a SOC record that has not previously been selected. After step 281, control passes back to step 210.

In step 282, DMST 110 creates a list of source attribute (SA) records. Each SA record in the list corresponds to an attribute that is defined in source schema 140. The list of SA records is preferably stored in a memory or cache within computer system 100.

Figure 3B:
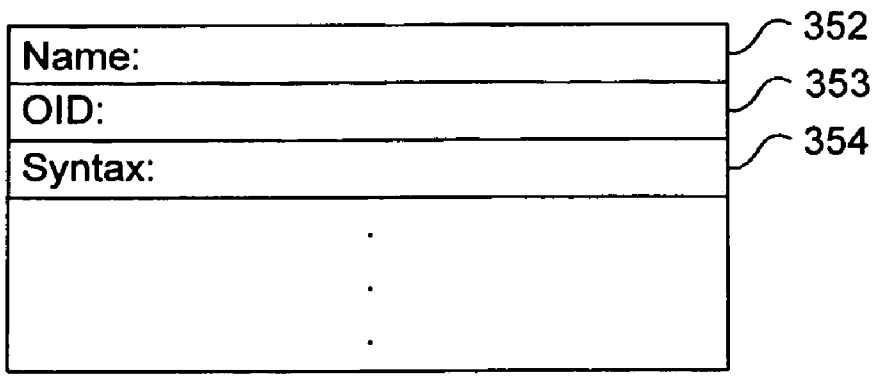
FIG. 3B is a representation of an attribute record.

FIG. 3B illustrates an example SA record 350 that corresponds to an attribute defined in source schema 140. Record 350 includes fields 352-354. Field 302 stores the name of the corresponding attribute, field 303 stores the OID of the corresponding attribute, and field 304 stores the syntax of the corresponding attribute. Record 350 may also include other fields that correspond to other components of an attribute, such as substring, equality, etc.

In step 283, DMST 110 creates list of destination attribute (DA) records. Each DA record in the list corresponds to an attribute that is defined in destination schema 150. The list of DA records is preferably stored in a memory or cache within computer system 100. A DA record includes the same fields as an SA record.

In step 284, DMST 110 selects a record from the list of SA records. In step 285, DMST 110 searches each record in the list of DA records for a DA record that "matches" or "partially matches" the selected SA record. A DA record "matches" an SA record when the attribute Name in the DA record matches the attribute Name in the SA record. A DA record "partially matches" an SA record when the attribute OID in the DA record matches the attribute OID in the SA record, but the attribute Name in the DA record does not match the attribute Name in the SA record.

In step 286, a determination is made as to whether a matching DA record was found. If a matching DA record was found, control passes to step 292, otherwise control passes to step 287. In step 287, a determination is made as to whether a partially matching DA record was found. If a partially matching DA record was found, control passes to step 240, otherwise control passes to step 288.

In step 240, DMST 110 selects an OID from a set of registered OIDs. Next (step 241), DMST 110, directly or indirectly adds to destination schema 150 an attribute that is identical to the attribute corresponding to the selected SA record with the exception that the OID of the attribute added to destination schema 150 is set to the OID selected in step 240. Next (step 242), one or more rules are defined for mapping data from source database 142 to the new attribute added to destination schema 150. After step 242, control passes to step 280.

In step 288, DMST 110 adds to destination schema 150 an attribute definition that exactly matches the attribute corresponding to the selected SA record. DMST 110 may do this by either adding the appropriate entry to the LDIF file or sending the appropriate command and data to the LDAP server. After step 288, control passes to step 296.

In step 292, DMST 110 determines whether the syntax of the attribute corresponding to the matching DA record matches the syntax of the attribute corresponding to the selected SA record. If they do match, control passes to step 294, otherwise control passes to step 293. In step 293, a filter is created or selected to morph the data from the source's syntax to the destination's syntax. This filter must be used before adding the data to destination directory 152.

In step 294, other components of the SA record (e.g., equality, substring, usage, etc.) are compared to the corresponding components of the DA record to determine if other changes to the attribute corresponding to the selected DA record need to made and those changes are made using the values from the SA record to replace the values in the attribute so that the attribute corresponding to the selected DA record will more closely match the attribute corresponding to the selected SA record. After step 294, control passes to step 296.

In step 296, DMST 110 determines whether there are any SA records in the list that have not been selected. If there are, control passes to step 297, otherwise the process ends. In step 297, DMST 110 selects from the list of SA records an SA record that has not previously been selected. After step 297, control passes back to step 285.

The rules for resolving schema conflicts described above are also used in performing the "update-as-needed" operation. Thus, the process of performing the update-as-needed operation is similar to the process of performing the update-schema operation. A difference between the two operations is that in the update-schema operation all object classes and attributes defined in source schema 140 are compared against the destination schema, regardless of the records that are in source directory 142, whereas in the update-as-needed operation only those object classes and attributes that are associated with records in source directory 142 that are to be migrated to destination directory 152 are compared against destination schema 150.

While various illustrative embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method to be implemented on a general purpose computer for migrating records from a source directory having a source schema to a destination directory having a destination schema, comprising:
   determining whether an object class defined in the source schema matches an object class defined in the destination schema; and
   determining whether the destination schema needs to be modified in order to be compatible with the source schema if it is determined that the object class defined in the source schema matches the object class defined in the destination schema, wherein the determination is based at least in part on information concerning the object class defined in the source schema and information concerning the object class defined in the destination schema.

2. The method of claim 1, wherein the step of determining whether the object class defined in the source schema matches the object class defined in the destination schema comprises:
   creating a first list of object class records, wherein each object class record in the first list is associated with the object class defined in the source schema and includes information about the associated object class;
   creating a second list of object class records, wherein each object class record in the second list is associated with the object class defined in the destination schema and includes information about the associated object class;
   selecting an object class record from the first list; and
   comparing the selected object class record to the object class records in the second list to find a matching or partially matching record.

3. The method of claim 2, further comprising:
adding an object class directly or indirectly to the destination schema if the second list does not include a matching or partially matching object class record, wherein the added object class is identical to the object class associated with the object class record selected from the first list.

4. The method of claim 2, further comprising:
adding an object class directly or indirectly to the destination schema if the second list includes a partially matching object class record, wherein the added object class is nearly identical to the object class associated with the object class record selected from the first list.

5. The method of claim 2, wherein the determination of whether the destination schema needs to be modified in order to be compatible with the source schema is based at least in part on information included in the selected object class record and information included in the matching object class record.

6. The method of claim 3, wherein the source directory and the destination directory are lightweight directory access protocol (LDAP) directories.

7. The method of claim 6, wherein the step of adding the object class to the destination schema comprises adding an entry to a lightweight directory interchange format (LDIF) file.

8. The method of claim 6, wherein the step of adding the object class to the destination schema comprises transmitting a request to an LDAP server associated with the destination directory.

9. The method of claim 1, further comprising:
creating a first list of attribute records, wherein each attribute record in the first list is associated with an attribute defined in the source schema and includes information about the associated attribute;
creating a second list of attribute records, wherein each attribute record in the second list is associated with an attribute defined in the destination schema and includes information about the associated attribute;
selecting an attribute record from the first list;
comparing the selected attribute record to the attribute records in the second list to find a matching or partially matching attribute record;
adding an attribute to the destination schema if the second list does not include a matching or partially matching record, wherein the added attribute is identical to the attribute associated with the attribute record selected from the first list; and
comparing content from the attribute record selected from the first list to content from the matching attribute record to determine whether the destination schema needs to be modified in order to be compatible with the source schema if the second list does include a matching record.

10. The method of claim 9, wherein the content from the selected attribute record comprises information about syntax that is associated with the attribute associated with the selected attribute record and the content from the matching attribute record comprises information about the syntax that is associated with the attribute associated with the matching attribute record.

11. The method of claim 10, further comprising creating or selecting a filter if the syntax associated with the attribute associated with the selected attribute record is not equivalent to the syntax associated with the attribute associated with the matching attribute record.

12. The method of claim 1, wherein the step of determining whether the destination schema needs to be modified comprises determining the object class type of the object class defined in the source schema.

13. The method of claim 12, further comprising determining the object class type of the matching object class defined in the destination schema if the determined object class type of the object class defined in the source schema is Undefined.

14. A method to be implemented on a general purpose computer for migrating records from a source directory to a destination directory having a destination schema, comprising:
retrieving an entry from the source directory that is to be added to the destination directory;
determining whether the destination schema allows the entry to be added to the destination directory;
updating the destination schema if the schema does not allow the entry to be added to the destination directory;
adding the entry to the destination directory; and
repeating the above steps for each entry from the source directory that is to be added to the destination directory.

15. The method of claim 14, wherein the step of determining whether the destination schema will allow the entry to the added to the destination directory comprises:
determining an object class that is associated with the entry; and
determining whether the destination schema defines an object class that matches the object class that is associated with the entry.

16. The method of claim 15, further comprising adding an object class to the destination schema if the destination schema does not define an object class that matches the object class that is associated with the entry.

17. The method of claim 14, wherein the step of determining whether the destination schema will allow the entry to the added to the destination directory comprises:
determining an attribute that is associated with the entry; and
determining whether the destination schema defines an attribute that matches the attribute that is associated with the entry.

18. The method of claim 17, further comprising adding an attribute to the destination schema if the destination schema does not define an attribute that matches the attribute that is associated with the entry.

19. A computer system for migrating records from a source directory having a source schema to a destination directory having a destination schema, comprising:
first determining means for determining whether an object class defined in the source schema matches an object class defined in the destination schema; and
second determining means for determining whether the destination schema needs to be modified in order to be compatible with the source schema, wherein the determination is based at least in part on information concerning the object class defined in the source schema and information concerning the object class defined in the destination schema.

20. The system of claim 19, wherein the first determining means comprises:
a first list of object class records, wherein each object class record in the first list is associated with an object class defined in the source schema and includes information about the associated object class;
a second list of object class records, wherein each object class record in the second list is associated with an object class defined in the destination schema and includes information about the associated object class;

object class selector means for selecting an object class record from the first list; and object class comparator means for comparing the selected object class record to the object class records in the second list to find a matching or partially matching record.

21. The system of claim 20, further comprising:

first schema updater means for adding an object class directly or indirectly to the destination schema if the second list does not include a matching or partially matching object class record, wherein the added object class is identical to the object class associated with the object class record selected from the first list.

22. The system of claim 21, wherein the source directory and the destination directory are lightweight directory access protocol (LDAP) directories.

23. The system of claim 22, wherein the first schema updater means adds the object class to the destination schema by adding an entry to a lightweight directory interchange format (LDIF) file.

24. The system of claim 22, wherein the first schema updater means adds the object class to the destination schema by transmitting a request to an LDAP server associated with the destination directory.

25. The system of claim 20, further comprising first schema updater means for adding an object class directly or indirectly to the destination schema if the second list includes a partially matching object class record, wherein the added object class is nearly identical to the object class associated with the object class record selected from the first list.

26. The system of claim 20, wherein the second determining means further determines whether the destination schema needs to be modified in order to be compatible with the source schema by comparing information included in the selected object class record with information included in the matched object class record.

27. The system of claim 19, further comprising:

a first list of attribute records, wherein each attribute record in the first list is associated with an attribute defined in the source schema and includes information about the associated attribute; and a second list of attribute records, wherein each attribute record in the second list is associated with an attribute defined in the destination schema and includes information about the associated attribute, wherein attribute selector means for selecting an attribute record from the first list;

attribute comparator means for comparing the selected attribute record to the attribute records in the second list to find a matching or partially matching attribute record; and second schema updater means for adding an attribute to the destination schema if the second list does not include a matching or partially matching record, wherein the added attribute is identical to the attribute associated with the attribute record selected from the first list, wherein the attribute comparator means compares content from the attribute record selected from the first list to content from the matching attribute record to determine whether the destination schema needs to be modified in order to be compatible with the source schema if the second list includes a matching record.

28. The system of claim 27, wherein the content from the selected attribute record comprises information about syntax that is associated with the attribute associated with the selected attribute record and the content from the matching attribute record comprises information about the syntax that is associated with the attribute associated with the matching attribute record.

29. The system of claim 28, further comprising a filter that transforms data from the syntax associated with the attribute associated with the selected attribute record to the syntax that is associated with the attribute associated with the matching attribute record.

30. A computer program product for migrating records from a source directory having a source schema to a destination directory having a destination schema, the computer program product being embodied in a computer readable medium and comprising computer instructions for:

determining whether an object class defined in the source schema matches an object class defined in the destination schema; and determining whether the destination schema needs to be modified in order to be compatible with the source schema if it is determined that the object class defined in the source schema matches an object class defined in the destination schema, wherein the determination is based at least in part on information concerning the object class defined in the source schema and information concerning the object class defined in the destination schema.

\* \* \* \* \*